United States Patent
Byun et al.

(10) Patent No.: US 10,019,114 B2
(45) Date of Patent: Jul. 10, 2018

(54) DISPLAY DEVICE INCLUDING DIGITIZER

(71) Applicant: Samsung Display Co., Ltd., Yongin-si, Gyeonggi-Do (KR)

(72) Inventors: Sang Chul Byun, Anyang-si (KR); Seok Hyun Nam, Seoul (KR); Se Ki Park, Hwaseong-si (KR); Young Hye Son, Seoul (KR); Sang Hyuk Lee, Anyang-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 282 days.

(21) Appl. No.: 14/736,622

(22) Filed: Jun. 11, 2015

(65) Prior Publication Data

US 2016/0092030 A1    Mar. 31, 2016

(30) Foreign Application Priority Data

Sep. 25, 2014 (KR) ........................ 10-2014-0128252

(51) Int. Cl.
| | |
|---|---|
| *G06F 3/042* | (2006.01) |
| *G06F 3/041* | (2006.01) |
| *F21V 8/00* | (2006.01) |
| *G06F 3/046* | (2006.01) |

(52) U.S. Cl.
CPC ......... *G06F 3/0421* (2013.01); *G02B 6/0031* (2013.01); *G02B 6/0051* (2013.01); *G02B 6/0083* (2013.01); *G06F 3/046* (2013.01); *G06F 3/0412* (2013.01); *G02B 6/0018* (2013.01); *G02B 6/0055* (2013.01); *G02B 6/0065* (2013.01); *G02B 6/0073* (2013.01); *G02B 6/0085* (2013.01); *G02B 6/0091* (2013.01)

(58) Field of Classification Search
CPC ..... G06F 3/041; G06F 3/046; G02F 1/133615
USPC ........................................................ 345/175
See application file for complete search history.

(56) References Cited

U.S. PATENT DOCUMENTS

| | | | | |
|---|---|---|---|---|
| 2004/0189587 A1* | 9/2004 | Jung | ................... | G02F 1/13338 345/102 |
| 2004/0189887 A1* | 9/2004 | You | ..................... | G02F 1/13338 349/58 |
| 2009/0231297 A1* | 9/2009 | Hatakeyama | ........ | G02B 6/0085 345/173 |

(Continued)

FOREIGN PATENT DOCUMENTS

| | | |
|---|---|---|
| KR | 10-2007-0103141 A | 10/2007 |
| KR | 10-2009-0054722 A | 6/2009 |
| KR | 10-2012-0079598 A | 7/2012 |

*Primary Examiner* — Yuzhen Shen
(74) *Attorney, Agent, or Firm* — H.C. Park & Associates, PLC (57) ABSTRACT

A display device may include a display panel, at least one light source disposed on one side of the display panel, a circuit board to drive the light source, a light guide plate in which light emitted from the light source is incident into a surface and is emitted to another surface, and a lower frame to support the display panel and to accommodate the light source and the light guide plate. The lower frame may include a base substrate, a digitizer disposed on the base substrate, and a dummy digitizer pattern disposed on the base substrate and spaced apart from the digitizer. The circuit board may be disposed between the digitizer and the dummy digitizer pattern, and the lower frame may be bent and extend around the light source.

19 Claims, 3 Drawing Sheets

(56) References Cited

U.S. PATENT DOCUMENTS

| | | | |
|---|---|---|---|
| 2012/0169642 A1 | 7/2012 | Lee | |
| 2014/0333519 A1* | 11/2014 | Lee | G06F 3/046 |
| | | | 345/102 |
| 2015/0116626 A1* | 4/2015 | Yu | G02B 6/0073 |
| | | | 349/58 |
| 2015/0362652 A1* | 12/2015 | Hayashi | G02B 6/005 |
| | | | 362/607 |

\* cited by examiner

DISPLAY DEVICE INCLUDING DIGITIZER

CLAIM OF PRIORITY

This application claims priority to Korean Patent Application No. 10-2014-0128252, filed on Sep. 25, 2014, and all the benefits accruing therefrom under 35 U.S.C. § 119, the content of which is incorporated herein in its entirety by reference.

BACKGROUND OF THE INVENTION

1. Field of Disclosure

Exemplary embodiments of the invention relate to a display device including a digitizer module.

2. Description of the Related Art

Display devices are categorized into a liquid crystal display (LCD), an organic light emitting diode (OLED) display, a plasma display panel (PDP), and an electrophoretic display (EPD) according to a method of emitting light.

A display device includes a digitizer module that inputs an electrical graphic signal by touching a screen on which an image is displayed. The digitizer module may be usually mounted in personal portable devices such as a notebook computer, an all-in-one personal computer (PC), a tablet PC, a smartphone, or a portable media player (PMP).

A digitizer is run in a direct input mode that directly receives positional information indicated by a user on a screen thereof unlike input devices (e.g. keyboards or mouse). The digitizer is often used to provide intuitive and convenient user interfaces.

A digitizer is also called a touchscreen or electric graphic input panel (EGIP), and can be broadly categorized into three types: a resistive type; a capacitive type; and an electromagnetic resonance (EMR) type (or electromagnetic type), according to a method of detecting a position indicated by a user.

A resistive digitizer detects (or senses) a position pressed by pressure on its surface by change in an amount of current, and a capacitive digitizer senses a touch location using capacitive coupling.

An EMR digitizer senses a touch location utilizing a digitizer sensor substrate including a plurality of coils. The EMR digitizer is not necessarily disposed on a front surface of a display panel unlike the resistive digitizer, and thus it can be disposed on a rear surface of a lower frame of a display device or disposed in the lower frame.

Meanwhile, a display device, in which a lower frame and a reflective sheet are integrally formed, has been recently proposed so as to minimize a thickness of the display device. However, a digitizer cannot be inserted into the display device having such an integral lower frame and light leakage is likely to be caused due to steps of a light incident portion.

It is to be understood that this background of the technology section is intended to provide useful background for understanding the here disclosed technology and as such, the technology background section may include ideas, concepts or recognitions that were not part of what was known or appreciated by those skilled in the pertinent art prior to corresponding effective filing dates of subject matter disclosed herein.

SUMMARY OF THE INVENTION

One or more exemplary embodiment of the invention is directed toward a display device including a digitizer, thereby minimizing a thickness of the display device and reducing or effectively preventing light leakage caused by steps of a light incident portion.

According to an exemplary embodiment of the invention, a display device includes: a display panel; at least one light source disposed on one side of the display panel; a circuit board configured to drive the light source; a light guide plate in which light emitted from the light source is incident into a surface and is emitted to another surface; and a lower frame configured to support the display panel and to accommodate the light source and the light guide plate. The lower frame may include: a base substrate; a digitizer disposed on the base substrate; and a dummy digitizer pattern spaced apart from the digitizer and disposed on the base substrate. The circuit board may be disposed between the digitizer and the dummy digitizer pattern, and the lower frame may be bent and extend around the light source.

The lower frame may further include a reflective sheet disposed on the digitizer and dummy digitizer pattern.

The dummy digitizer pattern may be bent and extend around the light source.

The reflective sheet may be bent and extend around the light source.

The circuit board may have a thickness that is less than or equal to the total thickness of the digitizer and reflective sheet.

The digitizer may include: a first substrate including a first wire configured to induce an electromagnetic field; and a second substrate disposed on the first substrate and including a second wire that extends at a predetermined angle with respect to the first wire.

The base substrate may include at least one of aluminum (Al), magnesium (Mg), and non-magnetic steel use stainless (SUS).

The light source may include at least one of one or more LED chips and a package configured to accommodate the one or more LED chips.

The circuit board may include at least one of a printed circuit board (PCB) and a metal core PCB.

According to an exemplary embodiment of the invention, a display device includes: a display panel; at least one light source disposed on one side of the display panel; a circuit board configured to drive the light source; a light guide plate in which light emitted from the light source is incident into a surface and is emitted to another surface; a supporter surrounding the light source and configured to support the display panel; and a lower frame configured to accommodate the light source, the light guide plate and the supporter. The lower frame may include: a base substrate and a digitizer disposed on the base substrate.

The display device may further include a dummy digitizer pattern spaced apart from the digitizer and disposed on the base substrate. The circuit board may be disposed between the digitizer and the dummy digitizer pattern.

The lower frame may further include a reflective sheet disposed on the digitizer and dummy digitizer pattern.

The display device may further include a reflective member disposed on a rear surface of the supporter.

The circuit board may have a thickness that is less than or equal to the total thickness of the digitizer and reflective sheet.

The digitizer may include: a first substrate including a first wire configured to induce an electromagnetic field; and a second substrate disposed on the first substrate and including a second wire that extends at a predetermined angle with respect to the first wire.

The base substrate may include at least one of aluminum (Al), an aluminum alloy, magnesium (Mg), a magnesium alloy, and non-magnetic steel use stainless (SUS).

The light source may include at least one of one or more LED chips and a package configured to accommodate the one or more LED chips.

The circuit board may include at least one of a printed circuit board (PCB) and a metal core PCB.

According to one or more exemplary embodiment of the invention, a display device includes a digitizer and reflective sheet which are integrated with each other in such a manner that may minimize a thickness of the display device.

Further, according to one or more exemplary embodiment of the invention, steps may be removed from a light incident portion of a display device, thereby reducing or effectively preventing light leakage.

The foregoing summary is illustrative only and is not intended to be in any way limiting the claims of the invention. In addition to the illustrative embodiments and features described above, further embodiments and features will become apparent by reference to the drawings and the following detailed description.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, in which like reference symbols indicate the same or similar components, wherein.

DETAILED DESCRIPTION OF THE INVENTION

Hereinafter, embodiments of the present system and method are described with reference to the accompanying drawings.

Example embodiments of the present system and method are illustrated in the accompanying drawings and described in the specification. The scope of the present system and method is not limited to the example embodiments and would be understood by those of ordinary skill in the art to include various changes, equivalents, and substitutions to the example embodiments.

In the specification, when a first element is referred to as being "connected" to a second element, the first element may be directly connected to the second element or indirectly connected to the second element with one or more intervening elements interposed therebetween. The terms "comprises," "comprising," "includes," and/or "including," when used in this specification, may specify the presence of stated features, integers, steps, operations, elements, and/or components, but do not preclude the presence or addition of one or more other features, integers, steps, operations, elements, and/or components.

Although the terms "first," "second," and "third" and the like may be used herein to describe various elements, the elements should not be limited by these terms. That is, while these terms may be used to distinguish one element from another element, they do not limit the elements themselves. Thus, any element may be referred to as "a first element," "a second element," or "a third element." The description of an element as a "first" element does not require or imply the presence of a second element or other elements. The terms "first," "second," etc. may also be used herein to differentiate different categories or sets of elements. In such context, the terms "first," "second," etc. may represent "first-type (or first-set)," "second-type (or second-set)," etc., respectively.

Like reference numerals may refer to like elements in the specification.

Hereinafter, according to an exemplary embodiment of the invention, a display device is a liquid crystal display (LCD), but the invention is not limited thereto. The display device according to exemplary embodiments of the invention is also applied to an organic light emitting diode (OLED) display or a plasma display.

Figure 1:
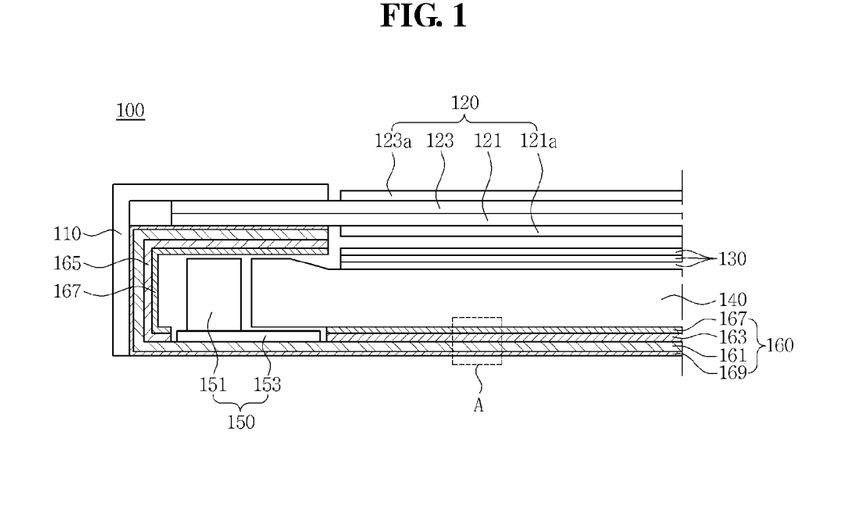
FIG. 1 is a cross-sectional view illustrating an exemplary embodiment of a display device according to the invention.
Figure 2:
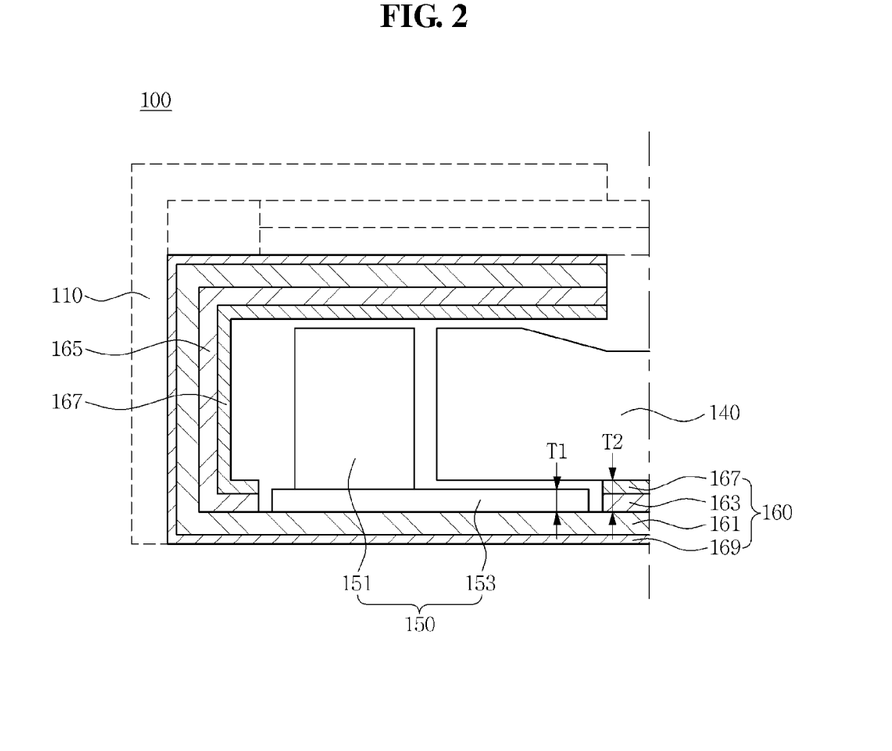
FIG. 2 is a partially enlarged view of a light incident portion of a display device according to an exemplary embodiment of the invention.
Figure 3:
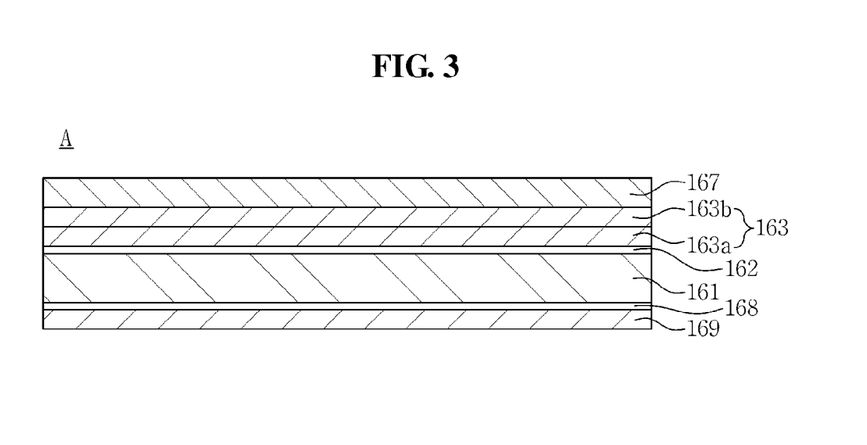
FIG. 3 is a partially enlarged view of part "A" of FIG. 1.

FIG. 1 is a cross-sectional view illustrating an exemplary embodiment of a display device according to the invention. FIG. 2 is a partially enlarged view of a light incident portion of a display device according to an exemplary embodiment of the invention. FIG. 3 is a partially enlarged view of part "A" of FIG. 1.

Referring to FIGS. 1 to 3, the display device 100 may include an upper frame 110, a display panel 120, an optical sheet 130, a light guide plate 140, a light source unit 150, and a lower frame 160.

Hereinafter, the optical sheet 130, the light guide plate 140, the light source unit 150, and the lower frame 160 may collectively be included in a backlight unit according to an exemplary embodiment, but the invention is not limited thereto.

The upper frame 110 may have an open window through which an active area of the display panel 120 is exposed outwards. The upper frame 110 may be defined to cover an upper edge portion and a side surface of the display panel 120.

The upper frame 110 may be configured to fix the upper edge portion of the display panel 120 so that the display panel 120 may not be detached from the backlight unit. The upper frame 110 may be fixed to the lower frame 160. The upper frame 110 may be fixed to the lower frame 160 utilizing hooks and/or screws.

The upper frame 110 may include a hard metal material such as stainless steel or a heat dissipating material such as aluminum or an aluminum alloy.

The display panel 120 may display an image using light and may be shaped like a quadrangular plate in a top plan view. The display panel 120 may include a lower substrate 121, an upper substrate 123 that faces the lower substrate 121, and a liquid crystal layer (not shown) between the lower and upper substrates 121 and 123.

The lower substrate 121 may include a plurality of pixel electrodes arranged in a matrix form (two-dimensional array), a thin film transistor (TFT) configured to apply drive voltages to each of the plurality of pixel electrodes, and signal lines configured to drive the plurality of pixel electrodes and the TFT.

The upper substrate 123 may be disposed to oppose (or face) the lower substrate 121, and may include a common electrode including a transparent conductive material and also include a color filter. Examples of the color filter may include red, green, and blue color filters.

The liquid crystal layer (not shown) may be interposed between the lower and upper substrates 121 and 123 and may be rearranged by an electric field between the pixel electrode and the common electrode. The rearranged liquid crystal layer may adjust transmittance of light emitted from the backlight unit and the light of which the transmittance is adjusted may pass through the color filter in such a manner that an image is displayed outwards.

A lower polarizer 121a may be disposed on a rear surface of the lower substrate 121 and an upper polarizer 123a may be disposed on an upper surface of the upper substrate 123. The lower and upper polarizers 121a and 123a may have an area corresponding to the display panel 120. The upper polarizer 123a may pass light of only a specific polarization and may absorb or block light of other polarizations regarding externally incident light. The lower polarizer 121a may pass light of only a specific polarization and may absorb or block light of other polarizations regarding light output from the backlight unit.

A driver circuit board (not shown) may be disposed on at least one side of the display panel 120 so as to drive the display panel 120. The driver circuit board may provide control signals and power signals that drive the display panel 120.

The optical sheet 130 may be disposed on the light guide plate 140 and may act to diffuse or collimate light received from the light guide plate 140. The optical sheet 130 may include a diffusion sheet, a prism sheet, and a protective sheet. The diffusion sheet, prism sheet, and protective sheet may be sequentially laminated on the light guide plate 140 in the order in which they are enumerated.

The prism sheet may collimate light guided by the light guide plate 140, the diffusion sheet may diffuse the light collimated by the prism sheet, and the protective sheet may protect the prism sheet. Light passing through the protective sheet may be provided to the display panel 120.

The light guide plate 140 may uniformly distribute light received from the light source unit 150 to the display panel 120. The light guide plate 140 may be disposed in the vicinity of the light source unit 150 and may also be disposed in the lower frame 160. The light guide plate 140 may be provided in the form of, for example, a quadrangular plate, but is not limited thereto. In the case where LED chips are used as a light source, the light guide plate 140 may be formed in various shapes including predetermined grooves, protrusions, or the like according to the position of the light source.

The light guide plate 140 is described herein as a plate for ease of description, but it may be provided in the form of a sheet or film to achieve slimness of a display device. That is, the light guide plate 140 may include not only a plate but also a film for guiding light.

The light guide plate 140 may include a light-transmissive material, e.g., an acrylic resin such as polymethylmethacrylate (PMMA) or polycarbonate (PC), so as to guide light efficiently.

The light source unit 150 may include a light source 151 and a circuit board 153 on which the light source 151 is disposed.

The light source 151 may be disposed at a corner portion, at an edge portion or at a light incident side of the light guide plate 140. That is, the light source 151 may emit light from the corner portion, the edge portion or the light incident side of the light guide plate 140. The light source 151 may include at least one LED chip (not shown) and a package (not shown) configured to accommodate the at least one LED chip. In an exemplary embodiment, the LED chip (not shown) may be a gallium nitride (GaN) LED chip that emits blue light.

The number of light sources 151 may vary depending on the size, luminance uniformity and so on of the display panel 120. The circuit board 153 may be, for example, a printed circuit board (PCB) or a metal core PCB. The circuit board 153 may be disposed on the lower frame 160 that will be described below and further description thereof will be provided below.

Although not illustrated in FIGS. 1 and 2, a wavelength conversion unit (not shown) may be disposed between the light guide plate 140 and the light source unit 150. The wavelength conversion unit (not shown) may include a substance that converts a wavelength of light. For example, the wavelength conversion unit may convert a wavelength of blue light emitted from a blue LED light source into white light.

The lower frame 160 may include a base substrate 161, a digitizer 163 disposed on the base substrate 161, a dummy digitizer pattern 165 spaced apart from the digitizer 163 and disposed on the base substrate 161, a reflective sheet 167 disposed on the digitizer 163 and dummy digitizer pattern 165, and a protective film 169 disposed along a perimeter (e.g., circumference) of the base substrate 161.

Referring to FIG. 3, an adhesive member 162 may be disposed between the base substrate 161 and the digitizer 163, and another adhesive member 168 may also be disposed between the base substrate 161 and the protective film 169.

In the lower frame 160, the protective film 169, the base substrate 161, the digitizer 163, and the reflective sheet 167 may be sequentially laminated, and thereafter may be integrally formed by high temperature pressing process (high-temperature hot pressing).

The base substrate 161 may be configured to maintain a shape of the display device and protect components disposed in the base substrate 161. The base substrate 161 may include at least one of aluminum (Al), an aluminum alloy, magnesium (Mg), a magnesium alloy, and non-magnetic steel use stainless (SUS). That is, the base substrate 161 may include a metal material having good heat dissipation properties and high hardness.

The digitizer 163 may be disposed on the base substrate 161. The digitizer 163 may include an electromagnetic type, but is not limited thereto. Any digitizer that is a generally used type may also be utilized herein without limitation.

The digitizer 163 may include a first substrate 163a including a first wire configured to induce an electromagnetic field, and also include a second substrate 163b disposed on the first substrate 163a and including a second wire that has a predetermined angle with the first wire. The first wire of the first substrate 163a and the second wire of the second substrate 163b may intersect (or cross) each other in such a manner that forms coordinates, thereby detecting a position of an external device (not shown) such as a stylus pen. The first and second wires are electrically conductive.

The dummy digitizer pattern 165 may be disposed on the base substrate 161 so as to be spaced apart from the digitizer 163. The dummy digitizer pattern 165 may not detect a position of an external device, which is different from the digitizer 163, but it may include the same components as the digitizer 163. Further description of the dummy digitizer pattern 165 will be provided below.

The reflective sheet 167 may be disposed on the digitizer 163 and dummy digitizer pattern 165, so that light emitted downwards from the light guide plate 140 may be reflected towards the display panel 120, thereby increasing light efficiency.

The reflective sheet 167 may include, for example, polyethylene terephthalate (PET) which imparts reflective properties, and one surface of the reflective sheet 167 may be coated with a diffusion layer containing, for example, titanium dioxide. Further, the reflective sheet 167 may include a material containing a metal such as silver (Ag).

The protective film 169 may be disposed along a perimeter of the base substrate 161. The protective film 169 may include an insulating film and an adhesive member that are sequentially laminated. The insulating film may include at least one of polyimide, acrylic, polyester, polyurethane, epoxy, and polystyrene.

Referring back to FIGS. 1 and 2, the light source unit 150 may include the light source 151 and the circuit board 153 disposed under the light source 151. The circuit board 153 may also be disposed between the digitizer 163 and the dummy digitizer pattern 165 on the base substrate 161.

Further, the circuit board 153 of the light source unit 150 may be disposed on the integral lower frame 160 in which the base substrate 161, the digitizer 163, and the reflective sheet 167 are sequentially laminated, after the digitizer 163 and the reflective sheet 167 are partially removed from the lower frame 160.

There may be a remaining part after the digitizer 163 is partially removed from the lower frame 160, and the dummy digitizer pattern 165 may be formed in the remaining part so as to be distinguished from the digitizer 163 that acts to substantially detect a position.

The circuit board 153 may have a thickness T1 that is substantially the same as or smaller than the total thickness T2 (sum of thicknesses) of the digitizer 163 and reflective sheet 167. Therefore, when the circuit board 153 is disposed at the position where the digitizer 163 and the reflective sheet 167 are removed, as shown in FIG. 2, the circuit board 153 well fits in the space between the digitizer 163 and the dummy digitizer pattern 165. In the display device 100 according to an exemplary embodiment of the invention, the circuit board 153 configured to drive the light source 151 may have a thickness that is substantially the same as or smaller than the total thickness of the digitizer 163 and reflective sheet 167, and thus steps may not be formed in a light incident portion. Therefore, it is possible to reduce or effectively prevent light leakage caused by steps of a light incident portion of a conventional display device.

The lower frame 160 may be bent and extend around the light source unit 150. That is, the lower frame 160 may be bent to surround the light source unit 150 and may extend above (over) the light source unit 150. Accordingly, the base substrate 161, the dummy digitizer pattern 165, and the reflective sheet 167, which are included in the bent lower frame 160, may also be bent to surround the light source unit 150 and may extend above (over) the light source unit 150.

As described above, the lower frame 160 may extend above the light source unit 150, and thus light emitted onto the light source unit 150 may be reflected to the light guide plate 140 by the reflective sheet 167, thereby improving light efficiency. Further, the lower frame 160 may support the display panel 120 using the bent portion of the lower frame 160, and thus no separate component that can support the display panel 120 is required, thereby achieving a slim display device.

Figure 4:
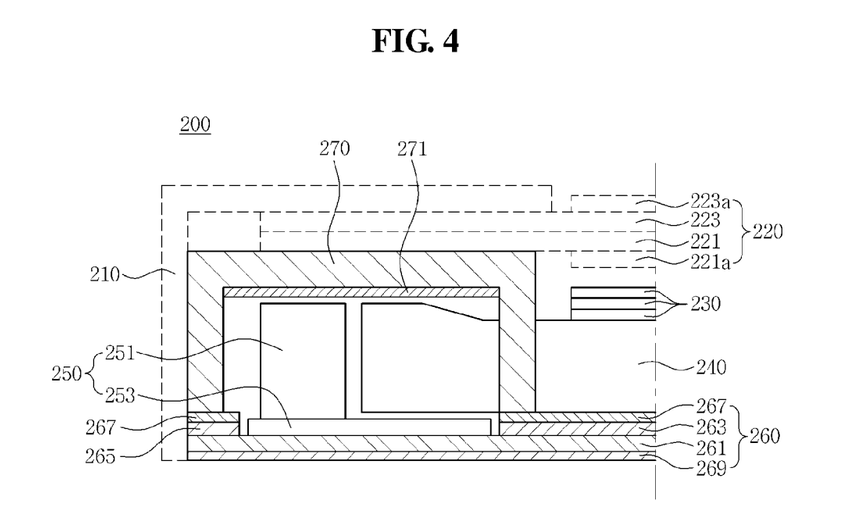
FIG. 4 is a cross-sectional view illustrating another exemplary embodiment of a display device according to the invention.
Figure 5:
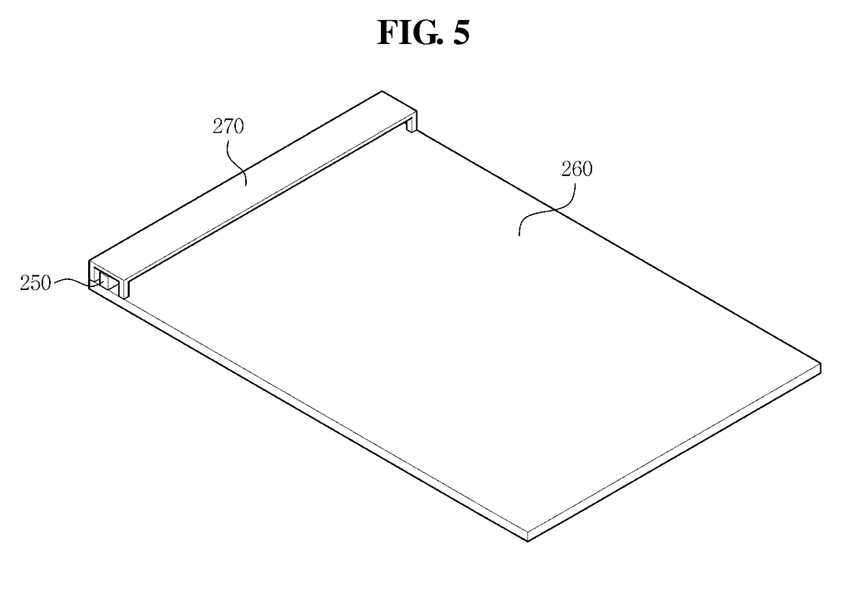
FIG. 5 is a perspective view illustrating another exemplary embodiment of a display device according to the invention.

FIG. 4 is a cross-sectional view illustrating another exemplary embodiment of a display device according to the invention. FIG. 5 is a perspective view illustrating another exemplary embodiment of a display device according to the invention. A description of the same configuration as the display device according to an exemplary embodiment of the invention will not be repeated below.

Referring to FIGS. 4 and 5, the display device 200 according to another exemplary embodiment of the invention includes an upper frame 210, a display panel 220, an optical sheet 230, a light guide plate 240, a light source unit 250, a lower frame 260, and a supporter 270.

The display panel 220 may display an image using light and may be shaped like a quadrangular plate in a top plan view. The display panel 220 may include a lower substrate 221, an upper substrate 223 that faces the lower substrate 221, and a liquid crystal layer (not shown) disposed between the lower and upper substrates 221 and 223. Further, a lower polarizer 221*a* may be disposed on a rear surface of the lower substrate 221 and an upper polarizer 223*a* may be disposed on an upper surface of the upper substrate 223.

The light source unit 250 may include a light source 251 and a circuit board 253 on which the light source 251 is disposed.

The light source 251 may be disposed at a corner portion, an edge portion or a light incident side of the light guide plate 240. That is, the light source 251 may emit light from the corner portion, the edge portion or the light incident side of the light guide plate 240. The light source 251 may include at least one LED chip (not shown) and a package (not shown) configured to accommodate the at least one LED chip.

The lower frame 260 may include a base substrate 261, a digitizer 263 disposed on the base substrate 261, a dummy digitizer pattern 265 spaced apart from the digitizer 263 and disposed on the base substrate 261, a reflective sheet 267 disposed on the digitizer 263 and dummy digitizer pattern 265, and a protective film 269 disposed along a perimeter (e.g., circumference) of the base substrate 261.

Further, the circuit board 253 of the light source unit 250 may be disposed on the integral lower frame 260 in which the base substrate 261, the digitizer 263, and the reflective sheet 267 are sequentially laminated, after the digitizer 263 and the reflective sheet 267 are partially removed from the lower frame 260.

There may be a remaining part after the digitizer 263 is partially removed from the lower frame 260, and the dummy digitizer pattern 265 is formed in the remaining part so as to be distinguished from the digitizer 263 that acts to substantially detect a position.

The circuit board 253 may have a thickness that is substantially the same as or smaller than the total thickness of the digitizer 263 and reflective sheet 267. In the display device 200 according to another exemplary embodiment of the invention, the circuit board 253 configured to drive the light source 251 may have a thickness that is substantially the same as or smaller than the total thickness of the digitizer 263 and reflective sheet 267, and thus steps may not occur in a light incident portion. Therefore, it is possible to reduce or effectively prevent light leakage caused by steps of a light incident portion of a conventional display device.

The supporter 270 may be disposed on the light source unit 250 so as to support the display panel 220. The supporter 270 may be disposed to surround the light source unit 250. The supporter 270 may be mounted on the lower frame 260 utilizing a surface mount technology (SMT). As shown in FIG. 5, the supporter 270 has legs contacting the lower frame 260, and the light guide plate 240 can be inserted between the legs of the supporter 270.

A reflective member 271 may be further disposed on a rear surface of the supporter 270 that faces (opposes) the light source unit 250. Light emitted onto the light source unit 250 may be reflected to the light guide plate 240 by the reflective member 271, thereby improving light efficiency of the display device.

In a display device according to one or more exemplary embodiments of the invention, a digitizer and reflective sheet may be partially removed from a lower frame in which the digitizer and reflective sheet are integrated with each other, and thereafter a circuit board may be disposed to drive a light source, so that steps may be eliminated from a light incident portion and light leakage may be reduced or effectively prevented.

Further, the integral lower frame may be bent to surround the light source and extend, and thus light emitted onto the light source may be reflected to a light guide plate, thereby increasing light efficiency.

From the foregoing, it will be appreciated that various exemplary embodiments of the invention have been described herein for purposes of illustration, and that various modifications may be made without departing from the scope and spirit of the disclosure. Accordingly, the various exemplary embodiments disclosed herein are not intended to limit the scope of the invention, and the true scope and spirit of the invention is indicated by the following claims, and equivalents thereof.

What is claimed is:

1. A display device comprising:
   a display panel;
   at least one light source disposed on one side of the display panel;
   a circuit board to drive the light source;
   a light guide plate, light emitted from the light source being incident into a surface of the light guide plate and being emitted to another surface of the light guide plate; and
   a lower frame to support the display panel and to accommodate the light source and the light guide plate, the lower frame comprising:
      a base substrate;
      a digitizer disposed on the base substrate; and
      a dummy digitizer pattern disposed on the base substrate, the dummy digitizer pattern being spaced apart from the digitizer, the circuit board disposed between the digitizer and the dummy digitizer pattern, the lower frame being bent and extending around the light source.

2. The display device of claim 1, wherein the lower frame further comprises a reflective sheet disposed on the digitizer and dummy digitizer pattern.

3. The display device of claim 2, wherein the reflective sheet is bent and extends around the light source.

4. The display device of claim 2, wherein the circuit board has a thickness that is smaller than or equal to a total thickness of the digitizer and reflective sheet.

5. The display device of claim 1, wherein the dummy digitizer pattern is bent and extends around the light source.

6. The display device of claim 5, wherein:
   the reflective sheet is bent and extends around the light source; and
   the circuit board has a thickness that is smaller than or equal to a total thickness of the digitizer and reflective sheet.

7. The display device of claim 6, wherein the digitizer comprises:
   a first substrate comprising a first wire to induce an electromagnetic field; and
   a second substrate facing the first substrate, the second substrate comprising a second wire extending at a predetermined angle with respect to the first wire.

8. The display device of claim 1, wherein the digitizer comprises:
   a first substrate comprising a first wire to induce an electromagnetic field; and
   a second substrate facing the first substrate, the second substrate comprising a second wire extending at a predetermined angle with respect to the first wire.

9. The display device of claim 1, wherein the base substrate comprises at least one selected from the group consisting of aluminum (Al), magnesium (Mg), and non-magnetic steel use stainless (SUS).

10. The display device of claim 1, wherein the light source comprises at least one of one or more LED chips and a package accommodating the one or more LED chips.

11. The display device of claim 1, wherein the circuit board comprises at least one of a printed circuit board (PCB) and a metal core PCB.

12. A display device comprising:
    a display panel;
    at least one light source disposed on one side of the display panel;
    a circuit board to drive the light source;
    a light guide plate, light emitted from the light source being incident into a surface of the light guide plate and being emitted to another surface of the light guide plate;
    a supporter surrounding the light source and supporting the display panel;
    a lower frame to accommodate the light source, the light guide plate, and the supporter, the lower frame comprising:
       a base substrate; and
       a digitizer disposed on the base substrate; and
    a dummy digitizer pattern spaced apart from the digitizer and disposed on the base substrate, the circuit board being disposed between the digitizer and the dummy digitizer pattern.

13. The display device of claim 12, wherein the lower frame further comprises a reflective sheet disposed on the digitizer and dummy digitizer pattern.

14. The display device of claim 13, wherein the circuit board has a thickness that is smaller than or equal to a total thickness of the digitizer and reflective sheet.

15. The display device of claim 12, further comprising a reflective member disposed on a rear surface of the supporter.

16. The display device of claim 12, wherein the digitizer comprises:
    a first substrate comprising a first wire to induce an electromagnetic field; and
    a second substrate facing the first substrate, the second substrate comprising a second wire extending at a predetermined angle with respect to the first wire.

17. The display device of claim 12, wherein the base substrate comprises at least one selected from the group consisting of aluminum (Al), an aluminum alloy, magnesium (Mg), a magnesium alloy, and non-magnetic steel use stainless (SUS).

18. The display device of claim 12, wherein the light source comprises at least one of one or more LED chips and a package accommodating the one or more LED chips.

19. The display device of claim 12, wherein the circuit board comprises at least one of a printed circuit board (PCB) and a metal core PCB.

\* \* \* \* \*